United States Patent [19]

Seto

[11] Patent Number: 5,039,998
[45] Date of Patent: Aug. 13, 1991

[54] PRINTING CONTROL SYSTEM FOR LASER PRINTER

[75] Inventor: Fumiaki Seto, Yokohama, Japan

[73] Assignee: Fujitsu Limited, Kawasaki, Japan

[21] Appl. No.: 631,927

[22] Filed: Dec. 21, 1990

[30] Foreign Application Priority Data

Dec. 26, 1989 [JP] Japan ................. 1-337666

[51] Int. Cl.⁵ ............................ G01D 9/42; B41J 2/44
[52] U.S. Cl. ................................... 346/108; 358/296
[58] Field of Search ................ 346/108, 107 R, 160, 346/76 L; 358/296, 300, 302

[56] References Cited

U.S. PATENT DOCUMENTS 3,897,150  7/1975  Bridges et al. .................. 356/5

FOREIGN PATENT DOCUMENTS

61-235810  10/1986  Japan .

*Primary Examiner*—Mark J. Reinhart
*Attorney, Agent, or Firm*—Staas & Halsey

[57] ABSTRACT

A printing control system is applied to a laser printer having a laser beam source for emitting a modulated laser beam, a laser beam scanner, a printing data memory to modulate a laser beam, a readout circuit for reading out printing data from the printing data memory, a beam-on signal generating circuit for generating a beam-on signal to emit a start beam from the laser beam source, a start pulse generating circuit for generating a start pulse after the detection of the start beam, and a beam-on signal resetting circuit for resetting the beam-on signal after the detection of the start pulse. The beam-on signal is forcibly turned OFF and the printing data from the printing data memory to the laser beam source is inhibited when an abnormal state of the start pulse due to an instantaneous cutoff of the laser beam is detected by the printing control system. Accordingly, printing operation is continued and stoppage of the printing is avoided even if a missing start pulse is detected.

3 Claims, 9 Drawing Sheets

PRINTING CONTROL SYSTEM FOR LASER PRINTER

BACKGROUND OF THE INVENTION

(1) Field of the Invention

The present invention relates to a printing control system in a laser printer for detecting a start pulse, and printing by actuating a laser beam source with a video signal synchronized with the start pulse, for controlling the laser printer when the start pulse is not detected.

(2) Description of the Related Art

Laser printers are very popular as electrophotographic printers. As is well known, a laser printer typically carries out the processes of: producing a uniform distribution of electrical charges on the surface of a rotary photosensitive drum; forming an electrostatic latent image on the electrically charged surface of the photosensitive drum by optically writing an image thereon with a laser beam scanner comprised of a rotating polygon mirror and a laser beam source; visually developing the electrostatic latent image with a developer, i.e. toner, which is electrically charged to be electrostatically adhered to the electrostatic latent image zone; electrostatically transferring the developed visible image or toner image from the drum to a sheet or pater; and fixing the transferred image on the sheet or paper.

In these laser printers, a gas-laser beam tube having a large output power is used as a laser beam source for a high speed laser printer. However, the laser beam from the gas laser beam tube may be instantaneously cutoff for example, for as much as 10 µs, due to the exisstance of a small obstacle of approximately 10 µm diameter in the gas laser beam tube.

If an instantaneous cutoff occurs, it will be impossible to detect the start pulse which starts reading out of the video memory, and it is impossible to carry out printing, so that a countermeasure for an instantaneous cutoff of the laser beam is considered necessary.

SUMMARY OF THE INVENTION

The object of the present invention is to provide a printing control system for a laser printer that can continue printing even if an abnormal start pulse due to the instantaneous cutoff of the laser beam from the laser beam source has been detected.

According to the present invention, when an abnormal state of the start pulse is detected, the beam-on signal for generating a first order beam for the start pulse is turned OFF and a reading operation of the video data is also inhibited so that the video signal is not oputput during the scan of the laser beam and one continuous dot line is not printed on the photosensitive drum but instead one continuous blank line is made.

Accordingly, in the present invention, printing operation is continued and stoppage of the printing is avoided even if a missing start pulse is detected, though one continuous blank line which can be ignored due to the high resolution of the printer is printed for each missing start pulse.

BRIEF DESCRIPTION OF THE DRAWINGS

The present invention will be more clearly understood from the description as set forth below with reference to the accompanying drawings, wherein.

DESCRIPTION OF THE PREFERRED EMBODIMENTS

Before describing the preferred embodiments, an explanation will be given of the conventional printing control system in the laser printer in FIGS. 1, 2A, 2B, and 2C.

Figure 1:
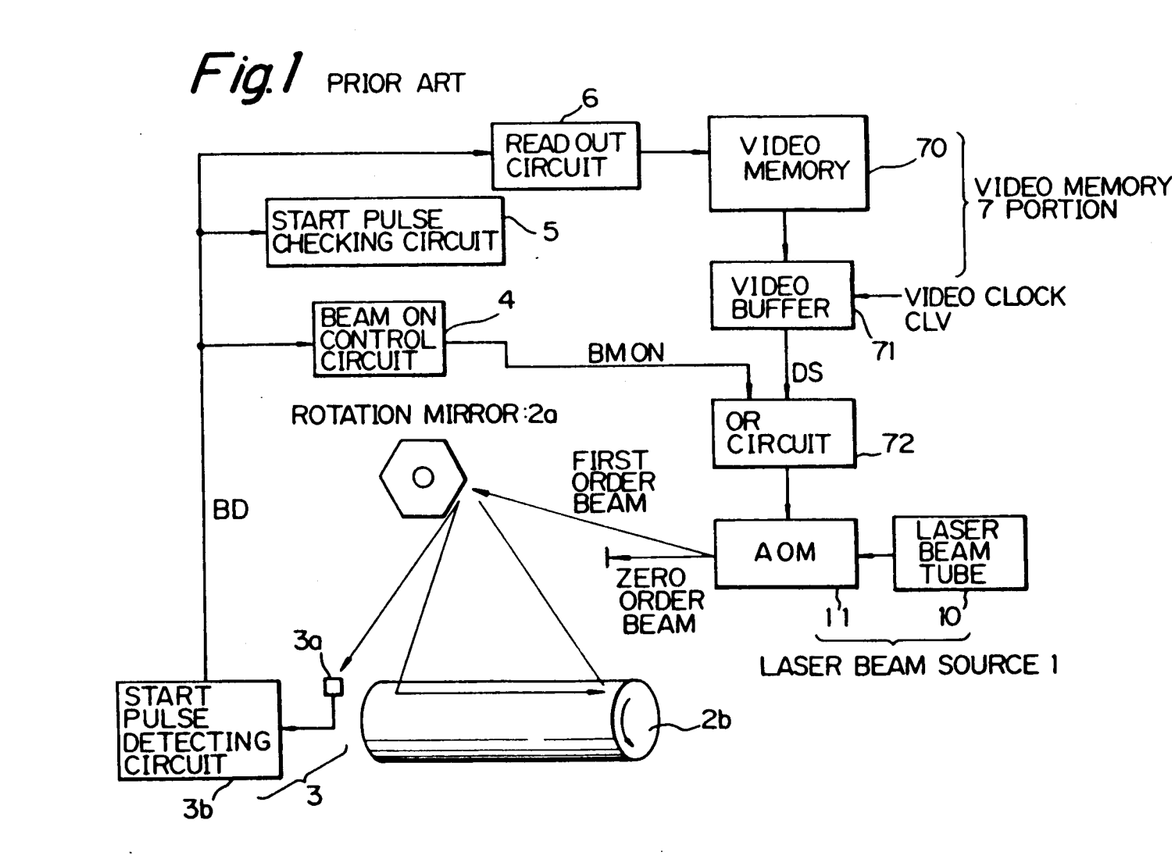
FIG. 1 is a schematic block diagram of a conventional printing control system in a laser printer.

FIG. 1 shows a conventional printing control system in a laser printer. A laser beam source 1 is comprised of a laser beam tube 10 and an AOM (Acoustic Optical Modulator) 11, and zero order and a first order modulated beams are obtained by operating the AOM 11 with modulation. The first order beam from the AOM 11 is reflected by a rotating polygon mirror 2a, and the first order beam is first irradiated on a start pulse detecting sensor 3a provided outside the end of a rotary photosensitive drum 2b, and then scanned on the rotary photosensitive drum 2b in accordance with the rotation of the polygon mirror.

Incidentally, the beam-on control circuit 4 periodically sets the beam-on signal BMON to an ON level (high level). The signal BMON is transmitted to the AOM 11 through an OR circuit 72 to generate the first order beam which will be irradiated on the start pulse detecting sensor 3a. When the start pulse detecting sensor 3a detects the start of the first order beam, a start pulse BD is then generated by a start pulse detecting circuit 3b and output therefrom. The start pulse BD is transmitted to a beam-on control circuit 4, a start pulse checking circuit 5, and a readout circuit 6.

Figures 2A, 2B:
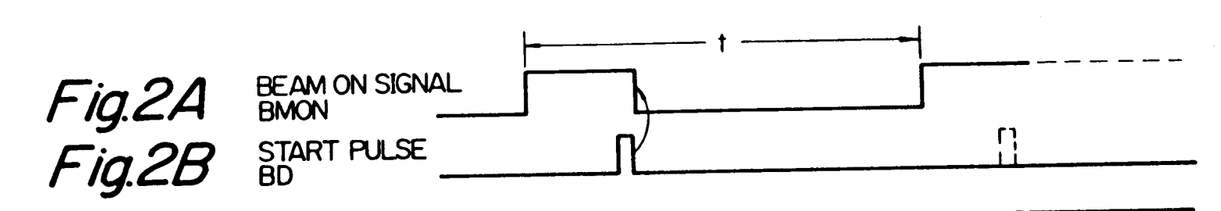
FIGS. 2A to 2C are time charts showing a relation between a beam-on signal, a start pulse, and a check output of the start pulse.

And when the start pulse BD is input to the beam-on control circuit 4 from the start pulse detecting circuit 3b, the beam-on control circuit sets the beam-on signal BMON to an OFF level (low level) at a trailing edge of the start pulse BD shown in FIGS. 2A and 2B.

When the start pulse BD is received by the readout circuit 6, one line of video data is readout from a video memory 70 of a video memory portion 7 after a predetermined delay time and stored in a video buffer 71. The one line of the video data is output as a serial video signal Ds from the video buffer 71 synchronized with a video clock CLV and transmitted to the AOM 11 through the OR circuit 72 to modulate the AOM 11.

Figure 2C:
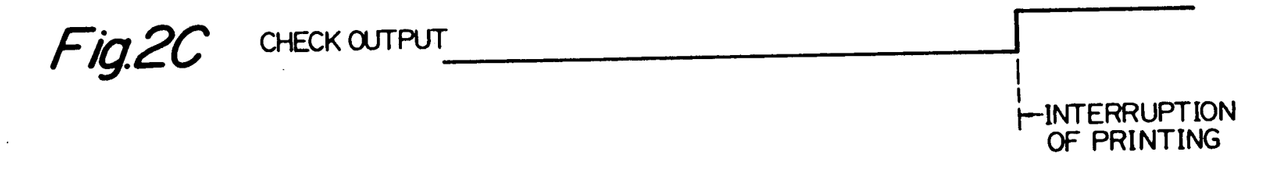

The start pulse BD is checked at a start pulse checking circuit 5, and a printing operation is immediately interrupted when an abnormal state of the start pulse BD is once detected in the conventional laser printer as shown in FIG. 2C. The abnormal state of the start pulse BD occurs due to the instantaneous cutoff of the laser beam from the laser beam source, for example, due to the exsistance of a small obstacle in the gas laser beam tube.

If the laser printer is not stopped in that state, the beam-on signal BMON is not turned to OFF since the first order beam to the start pulse sensor 3a is cutoff. In this case, the AOM 11 maintains ON, in other words, the AOM 11 is modulated by the ON level of the beam-on signal BMON during one scan at most, and the rotating mirror 2a continues to reflect the first order beam to the rotary photosensitive drum 2b until the beam-on signal BMON turns OFF. In this way, one continuous electrostatic latent image is drawn on the surface of the rotary photosensitive drum 2b with the laser beam when the first order beam to the start pulse sensor 3a is cutoff, so that one continuous dot line is printed on the sheet or the paper. Accordingly, it is important to stop the printing operation of the laser printer when the abnormal state of the start pulse is detected in order to avoid having one continuous dot line printed on the paper.

However, the previously described abnormal start pulse occurs when the laser beam from the laser beam source 1 is instantaneously cutoff, so that stopping the laser printer at every detection of the instantaneous cutoff of the laser beam has resulted in a problem of lowering the printing speed and lowering the printing efficiency.

Figures 3, 3A:
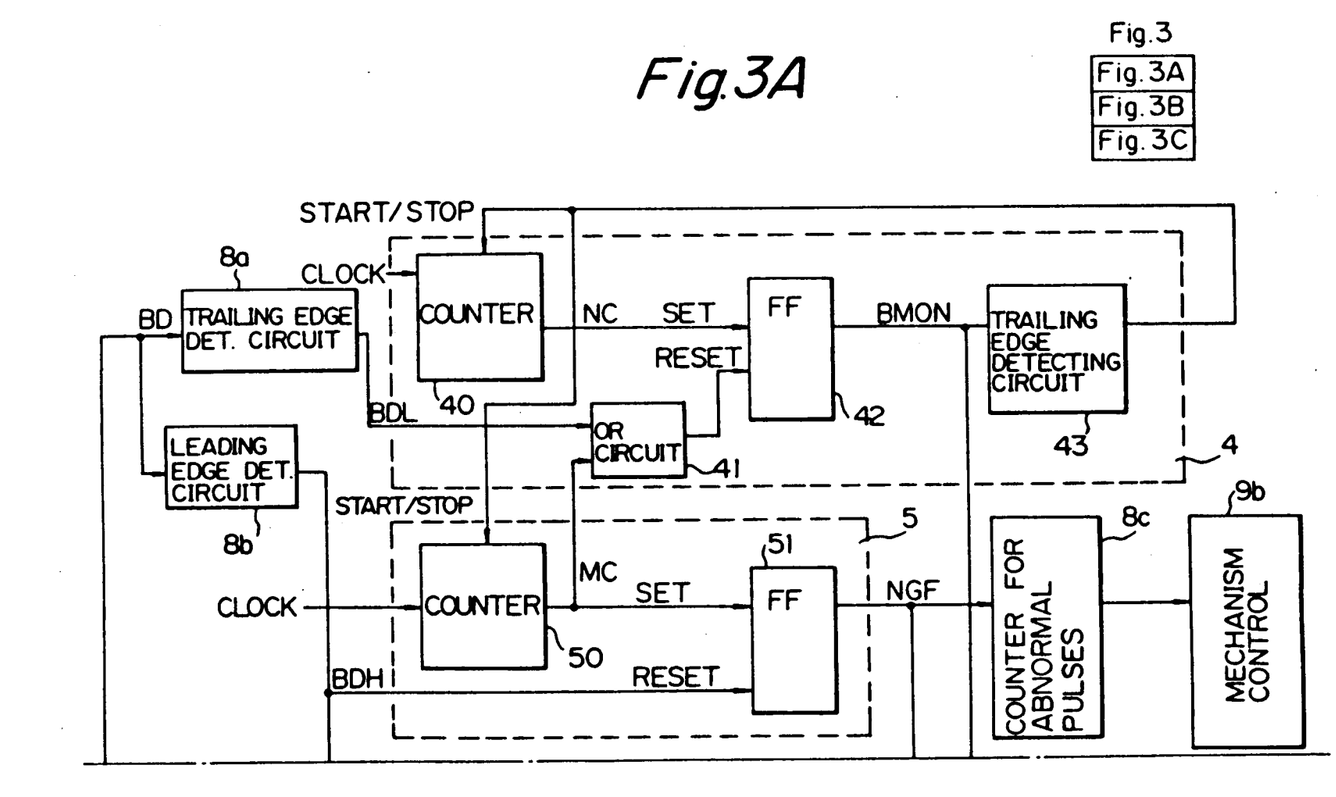
FIGS. 3A to 3C are a basic block diagram showing a structure of one embodiment of the printing control system in a laser printer according to the present invention.
Figure 3B:
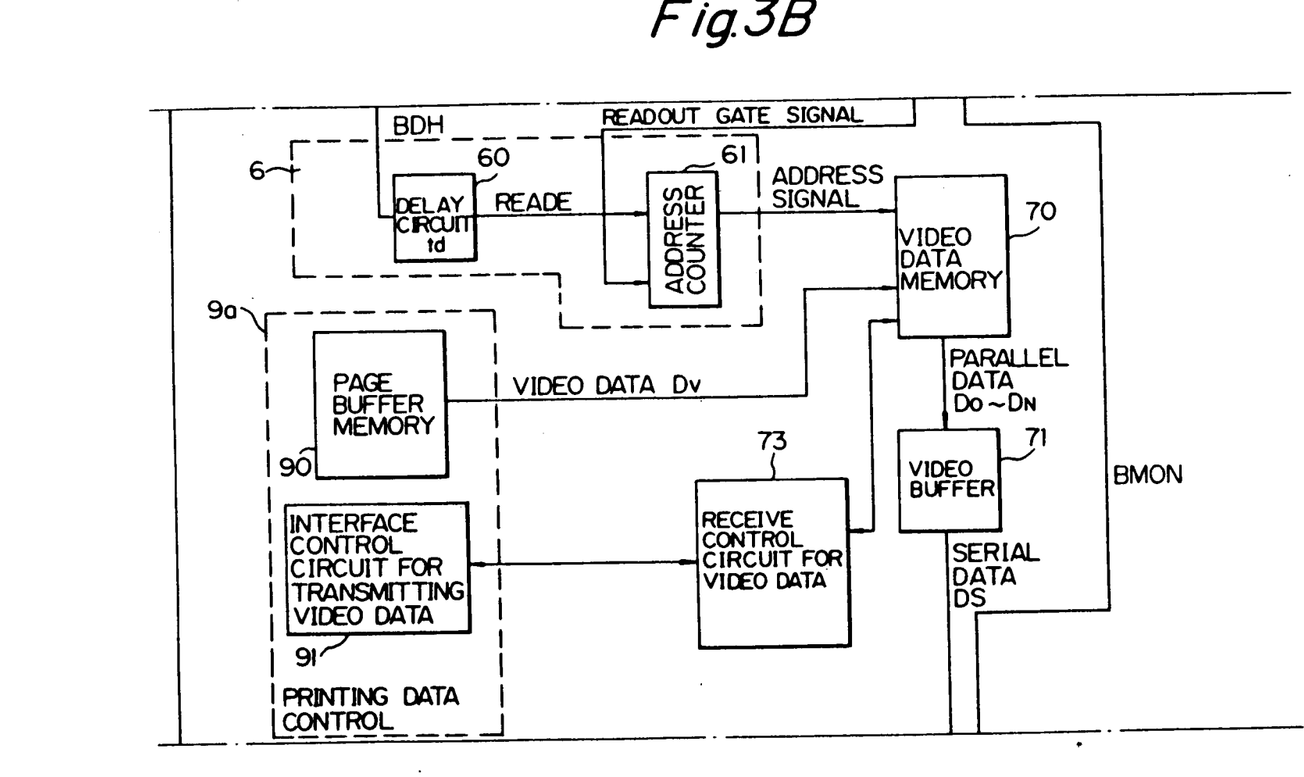
Figure 3C:
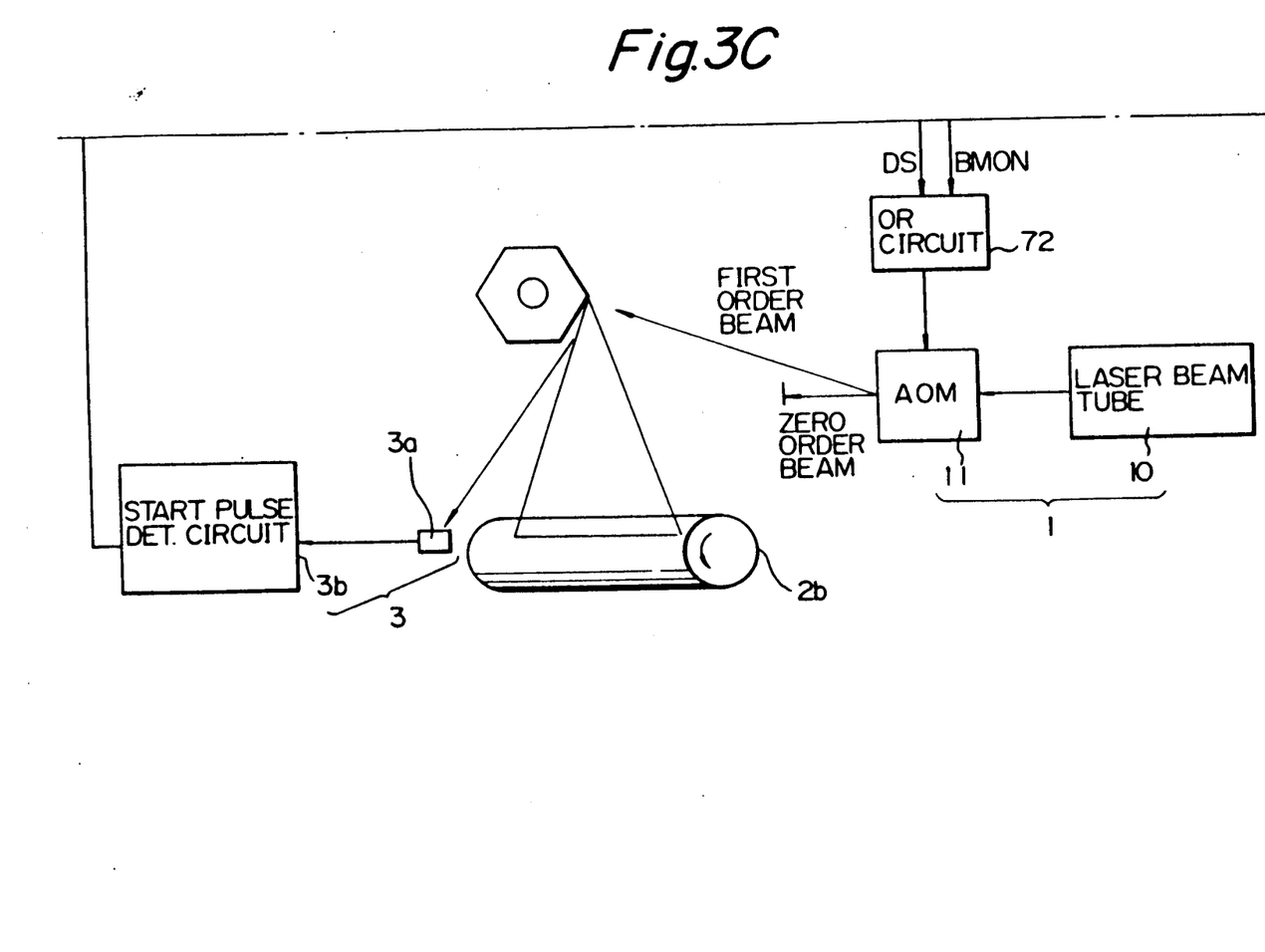

The composite of FIGS. 3A to 3C shows the construction of one embodiment of the printing control system for a laser printer according to the present invention. In the drawing, the same portions as shown in FIG. 1 are indicated with the same reference symbols.

In FIGS. 3A to 3C, 1 represents a laser beam source comprising a laser beam tube 10 and an AOM 11, and a laser beam from the laser beam tube 10 is modulated by the AOM 11. A zero order beam from the AOM 11 is irradiated on the shutter and a first order beam from the AOM 11 is reflected by a rotating polygon mirror 2a. The reflected first order beam is first irradiated on a start pulse detecting sensor 3a provided beyond the end of a rotary photosensitive drum 2b, and then scanned on the rotary photosensitive drum 2b in accordance with the rotation of the polygon mirror 2a.

When the start pulse detecting sensor 3a detects the start of the first order beam, then a start pulse BD is generated at a start pulse detecting circuit 3b connected to the sensor 3a and is output therefrom. The start pulse BD is transmitted to a beam-on control circuit 4 through a trailing edge detecting circuit 8a and a readout circuit 6 through a leading edge detecting circuit 8b. The trailing edge detecting cicuit 8a outputs a trailing edge signal BDL when it detects the trailing edge of the start pulse BD and the leading edge detecting circuit 8b outputs a leading edge signal BDH when it detects the leading edge of the start pulse BD.

The beam-on control circuit 4 includes a counter 40 for counting the clock signal of the laser printer, an OR circuit 41, a flip-flop 42, and a trailing edge detecting circuit 43. The counter 40 outputs a count-up output NC periodically when it counts N clock signals of the laser printer. The OR circuit 41 outputs the logical sum of a trailing edge signal BDL from the trailing edge detecting circuit 8a and a count-up output MC from a start pulse checking circuit 5 which will be explained later. The flip-flop 42 is set by the count-up output NC from the counter 40 and is reset by the output from the OR circuit 41, and outputs the beam-on signal BMON therefrom when it is set. The beam-on signal BMON is transmitted to the trailing edge detecting circuit 43 and the AOM 11 through an OR circuit 72. The trailing edge detecting circuit 43 transmits a signal BML when it detects the trailing edge of the beam-on signal BMON to the counter 40 and a counter 50 which will be explained later. By the signal from the trailing edge detecting circuit 43, the counting operation of the counter 40 is stopped, the counted value is reset, and the counting operation of the counter 40 is restarted.

The start pulse checking circuit 5 includes the counter 50 for counting the clock signal of the laser printer and a flip-flop 51. The counter 50 outputs a count-up output MC when it counts M clock signals of the laser printer. The numerical value of M is larger than the numerical value N. The counting operation of the counter 50 is stopped, the counted value is reset, and the counting operation is restarted by the output of the trailing edge detecting circuit 43. The flip-flop 51 is set by the count-up output MC of the counter 50 and is reset by the leading edge signal BDH from the leading edge detecting circuit 8b, and outputs an abnormal period indicating flag NGF therefrom when it is set.

The read-out circuit 6 includes a delay circuit 60 and an address counter 61. The delay circuit 60 delays the leading edge signal BDH from the leading edge detecting circuit 8b for a predetermined time td and outputs it as a readout enable signal READE. The address counter 61 outputs an address signal to the video data memory 70 in accordance with the readout enable signal READE, and this operation is inhibited when the abnormal period indicating flag NGF is input from the flip-flop 51. At this time, the abnormal period indicating flag NGF functions as a readout gate signal for the counter 61.

8c represents a counter for an abnormal pulse which counts an abnormal period indicating flag NGF from the start pulse checking circuit 5. And this counting circuit 8c outputs an alarm signal when the number of flags NGF exceeds a predetermined number.

9a represents a control portion for printing data, and having a page buffer memory 90 and an interface control circuit 91 for transmitting video data. The page buffer memory 90 stores printing data which equals video data of one page, and the interface control circuit 91 for transmitting video data controls the transmission of the video data readout from the page buffer memory 90 to the video data memory 70. 9b represents a control portion for the mechanism of the laser printer, which controls the mechanism and stops the printing operation of the printer when it receives the alarm signal from the counter 8c for an abnormal pulse.

73 represents a receive control circuit for video data. When the receive control circuit 73 detects that video data of one line is readout from the video data memory 70 comprised of FIFO (First-in-first-out) memory having a storage capacity of three lines, it requires an interface control circuit 91 for video data transmission to transmit another block of video data to the video data memory 70, and controls the writing of the video data Dv of one line in the page buffer memory 90 to the video data memory 70.

71 represents a video buffer which stores parallel video data $D_0$ to $D_N$ which equals one line of printing data. The video data $D_0$ to $D_N$ are converted to serial data in the form of a video signal Ds by the video buffer 71. The video signal Ds is transmitted to the AOM 11 through the OR circuit 72 to operate the AOM 11 and carry out one line of modulation.

Figure 4:
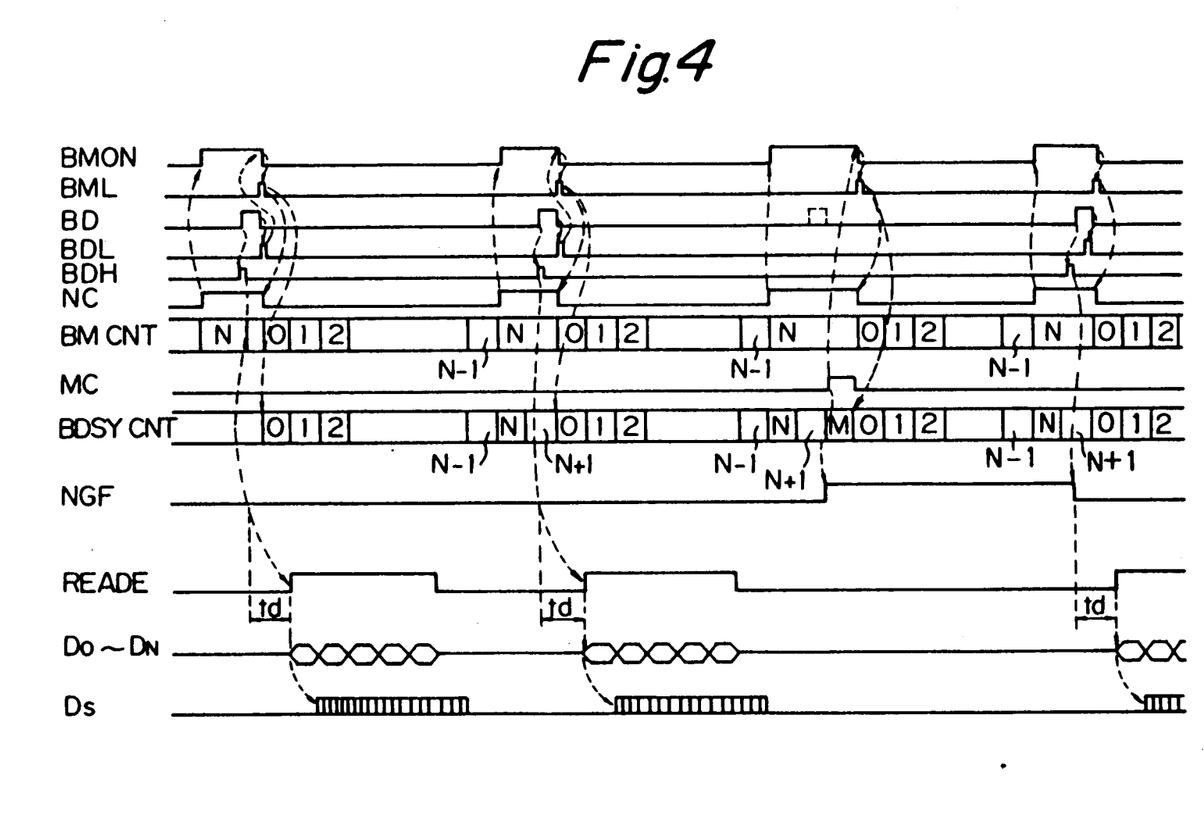
FIG. 4 is a timing chart of signals generated in the printing control system in a laser printer shown in FIGS. 3A to 3C.

FIG. 4 is a timing chart explaining an operation of the printing control system of the laser printer in FIGS. 3A to 3C according to the present invention. The meaning of the reference symbols indicated at the left side of the chart are as follows.

BMON: beam-on signal from the flip-flop 42;
BML: pulse from the trailing edge det. circuit 43;
BD: start pulse from the start pulse det. cicuit 3b;
BDL: signal from the trailing edge det. circuit 8a;
BDH: signal from the leading edge det. circuit 8b;
NC: signal from the counter 40;
BMCNT: counted value of the counter 40;
MC: signal from the counter 50;
BDSYCNT: counted value of the counter 50;
NGF: abnormal period indicating flag;
READE: readout enable signal;
$D_0 \sim D_N$: parallel video data from video data memory;
Ds: serial video signal.

(1) Normal state

The counter 40 of the beam-on control circuit 4 counts the clock of the laser printer and outputs the count-up signal NC when the counted value BMCNT of the counter 40 reaches "N". The flip-flop 42 is set by the count-up signal NC and outputs the beam-on signal BMON when it is set. The beam-on signal BMON is transmitted to the AOM 11 through the OR circuit 72 and the AOM 11 is actuated. When the AOM 11 is actuated, the first order beam is emitted therefrom. The first order beam is reflected by the rotation mirror 2a to arrive at the outside of the left edge of the rotary photosensitive drum.

If the laser beam tube is normal, start pulse detecting sensor 3a detects the first order beam and the start pulse BD is generated by the start pulse detecting circuit 3b. The generation of the start pulse BD comes to an end when the first order beam passes through the start pulse detecting sensor 3a in accordance with the rotation of the rotation mirror 2a.

The start pulse BD is transmitted to the leading edge detecting circuit 8b and the trailing edge detecting circuit 8a. Then the leading edge signal BDH is generated when the leading edge of the start pulse BD is detected at the leading edge detecting circuit 8b and the trailing edge detecting signal BDL is generated when the trailing edge of the start pulse BD is detected at the trailing edge detecting circuit 8a.

The trailing edge signal BDL is transmitted to the flip-flop 42 through the OR circuit 41 to reset the flip-flop 42 thereby turning the beam-on signal BMON to OFF. When the beam-on signal BMON is turned OFF, the first order beam for the start pulse detection is turned OFF. When the beam-on signal BMON turns OFF, the trailing detecting cirduit 43 detects the trailing edge of the beam-on signal BMON, and a detection pulse BML is transmitted from the trailing detecting cirduit 43 to the counters 40 and 50. When the detection pulse BML is input to the counters 40 and 50, the counters are stopped, reset, and the counting operation is restarted.

In this way, the counters 40 and 50 start counting at the same time, and the count-up signal NC is output from the counter 40 when the counted value BMCNT of the counter 40 is equal to "N" to set the flip-flop 42. The beam-on signal BMON is turned ON when the flip-flop 42 is set and is turned OFF when the flip-flop 42 is reset after the trailing edge of the start pulse BD is detected by the trailing edge detecting circuit 8a. The counters 40 and 50 are then stopped, the counted value is reset, and the counting by the pulse BML is restarted. In this condition, the counter 50 is stopped and reset before its counted value BDSYCNT reaches "M" which is smaller than "N" so that the count-up output MC is not generated by the counter 50.

The leading edge signal BDH is transmitted to the flip-flop 51 and the delay circuit 60. The leading edge signal BDH transmitted to the delay circuit 60 is delayed by time td, and the readout enable signal READE is output therefrom. The address counter 61 is actuated by the readout enable signal READE and the address signal from the address counter 61 is input to the video data memory 70. The video data memory 70 then outputs one line of parallel video data $D_0$ to $D_N$ and the video data $D_0$ to $D_N$ are converted to a serial video signal Ds at the video buffer 71. The video signal Ds is transmitted to the AOM 11 through the OR circuit 72 to operate the AOM 11 and carry out one line of modularion.

In this way, the modulated laser beam is reflected by the rotation mirror 2a line by line, producing a uniform distribution of electrical charges on the surface of a rotary photosensitive drum 2b, forming an electrostatic latent image on the electrically charged surface of the photosensitive drum 2a, visually developing the electrostatic latent image with a toner, which is electrically charged to be electrostatically adhered to the electrostatic latent image zone, electrostatically transferring the developed visible image or toner image from the drum 2b to a sheet or paper, and fixing the transferred image on the sheet or paper.

(2) Abnormal state

On the other hand, as shown by a dashed line in FIG. 4, if the start pulse BD is not detected, the counter 50 continues to count the clock signal and the counted value BDSYCNT reachs "M". In this condition, the count-up output MC is generated at the counter 50 and this count-up output MC is transmitted to the flip-flop 42 through the OR circuit 41. When the count-up output MC is input to the flip-flop 42, the flip-flop 42 is reset and the beam-on signal BMON is turned OFF.

The count-up output MC is also transmitted to the flip-flop 51 to set it. When the flip-flop 51 is set, the abnormal period indicating flag NGF is output therefrom and transmitted to the address counter 61 and the counter 8c. By the abnormal period indicating flag NGF, operation of the address counter 61 is interrupted and the readout operation of the video memory 70 is inhibited, and the counter 8c is incremented.

When the beam-on signal BMON is turned OFF, the detection pulse BDL is generated by the trailing edge detecting circuit 43 and the counters 40 and 50 are stopped, the counted value is reset, the counting by this detection pulse BML is restarted. The count-up outputs NC and MC from the counter 40 and 50 are also reset when the counters 40 and 50 are reset.

In this way, the counters 40 and 50 start to count the clock, and the counted value BMCNT of the counter 40 is equal to "N" again, the beam-on signal BM turns ON, and the first order beam for the start pulse detection is generated. After that the beam-on signal BMON is turned OFF and the readout enable READE is generated in the same manner as described before when the start pulse BD is detected.

At this time, the flip-flop 51 is reset by the leading edge signal BDH of the start pulse BD, the abnormal period indicating flag NGF is turned OFF, the inhibition of the operation of the address counter is released, and then readout of the video data memory 70 is restarted.

Contrary to this, if the start pulse BD is still not obtained, the abnormal period indicating flag NGF is kept ON and the abnormal pulse counter 8c is incremented. When the counted value of the counter 8c reachs a predetermined limit value, an alarm signal is transmitted from the counter 8c to the mechanism countrol 9b to stop the printing operation.

In this way, if the start pulse BD is not obtained, the beam-on control signal BMON is turned OFF, readout of the video data from the page buffer memory 90 is inhibited, and the operation of the AOM 11 is stopped during the scanning time of one line. If the next start pulse BD is obtained, readout of the video data is carried out and the printing is restarted.

Accordingly, one blank line is printed if the start pulse is not detected but the printing operation is not stopped in the present invention. And if the abnormal cycle of the start pulse occurs frequently, the printing operation is stopped indicating that the laser beam tube 10 or start pulse detecting portion 3 has failed.

Thus in the present invention, the printing speed of the laser printer and the efficiency of printing are not decreased even if the laser beam from the laser beam tube 10 is instantaneously cutoff. Further, one blank line is printed when there is a missing start pulse BD in the present invention, and the one blank line can be ignored and does not affect the quality of the printing in accordance with the development of the high resolution printing.

Figure 5A:
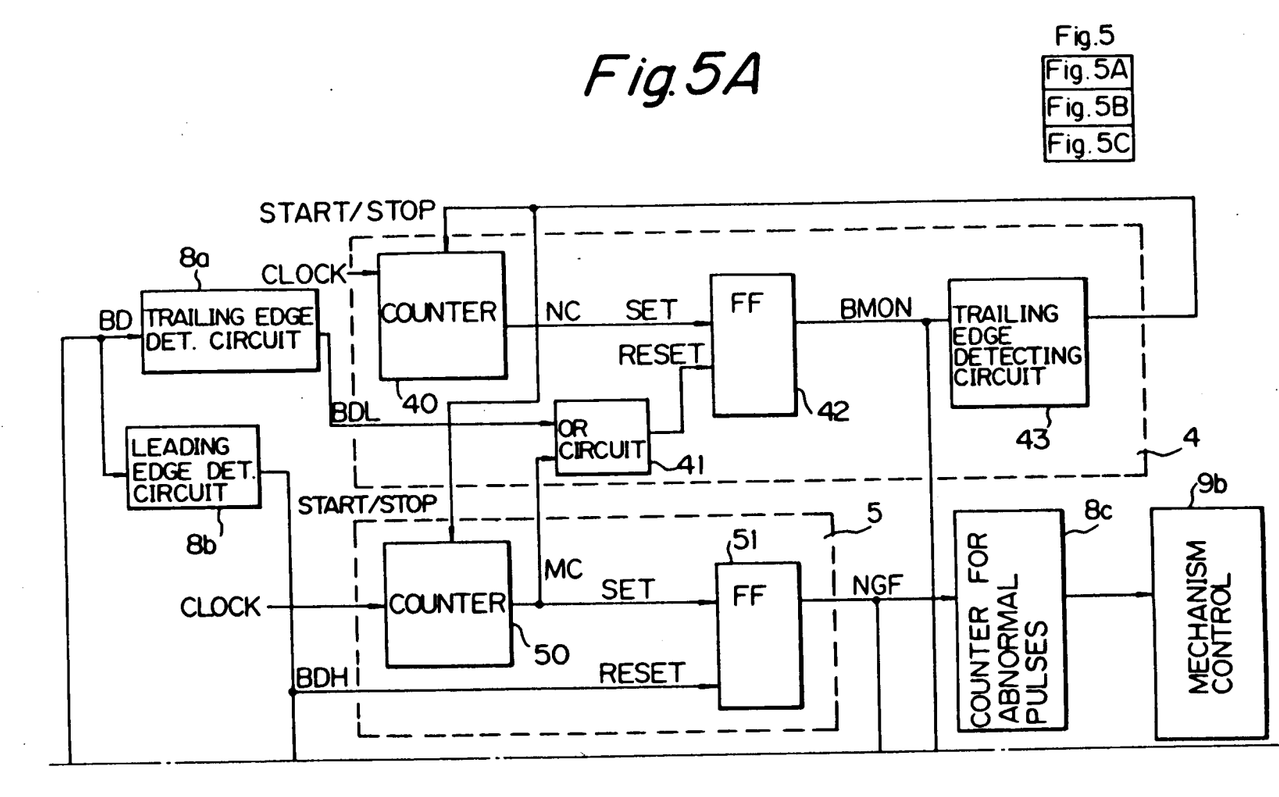
FIGS. 5A to 5C are a basic block diagram showing a structure of an other embodiment of the printing control system in a laser printer according to the present invention.
Figure 5B:
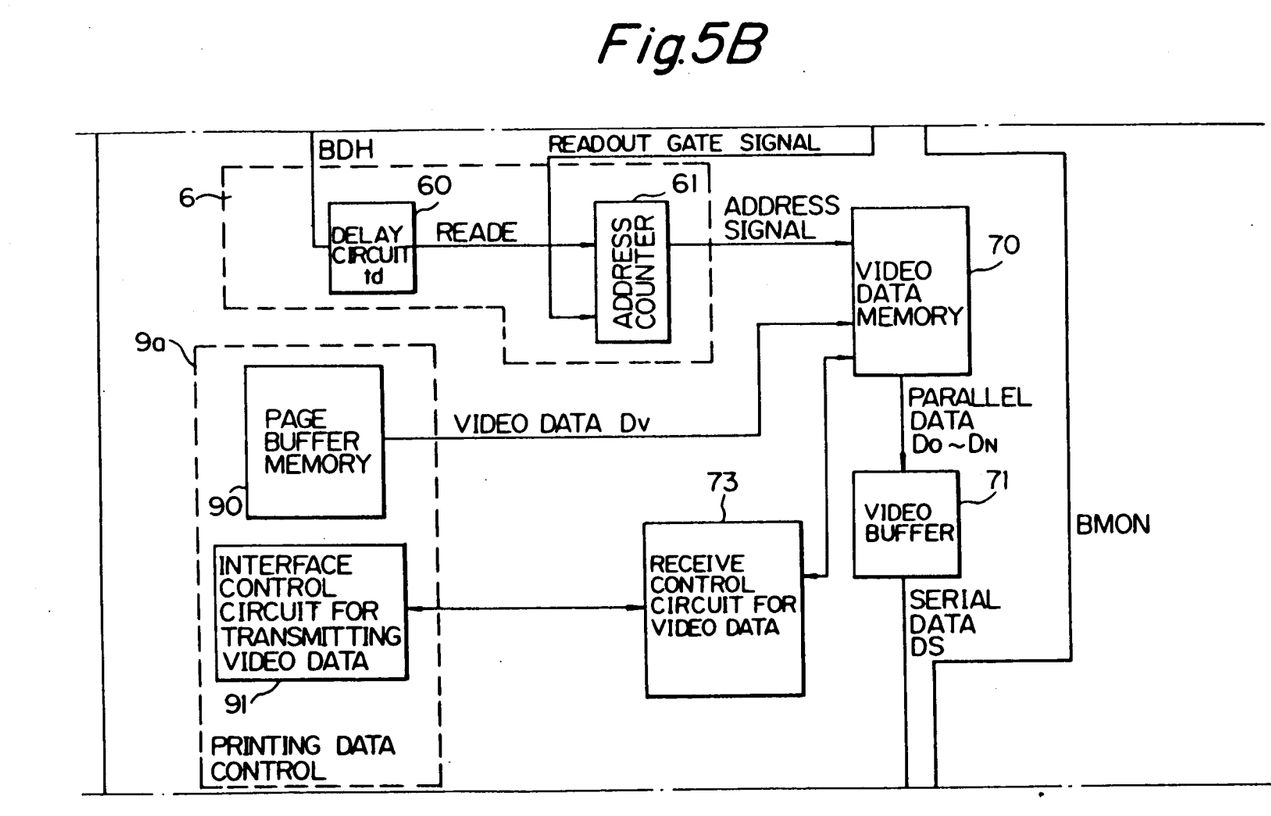
Figure 5C:
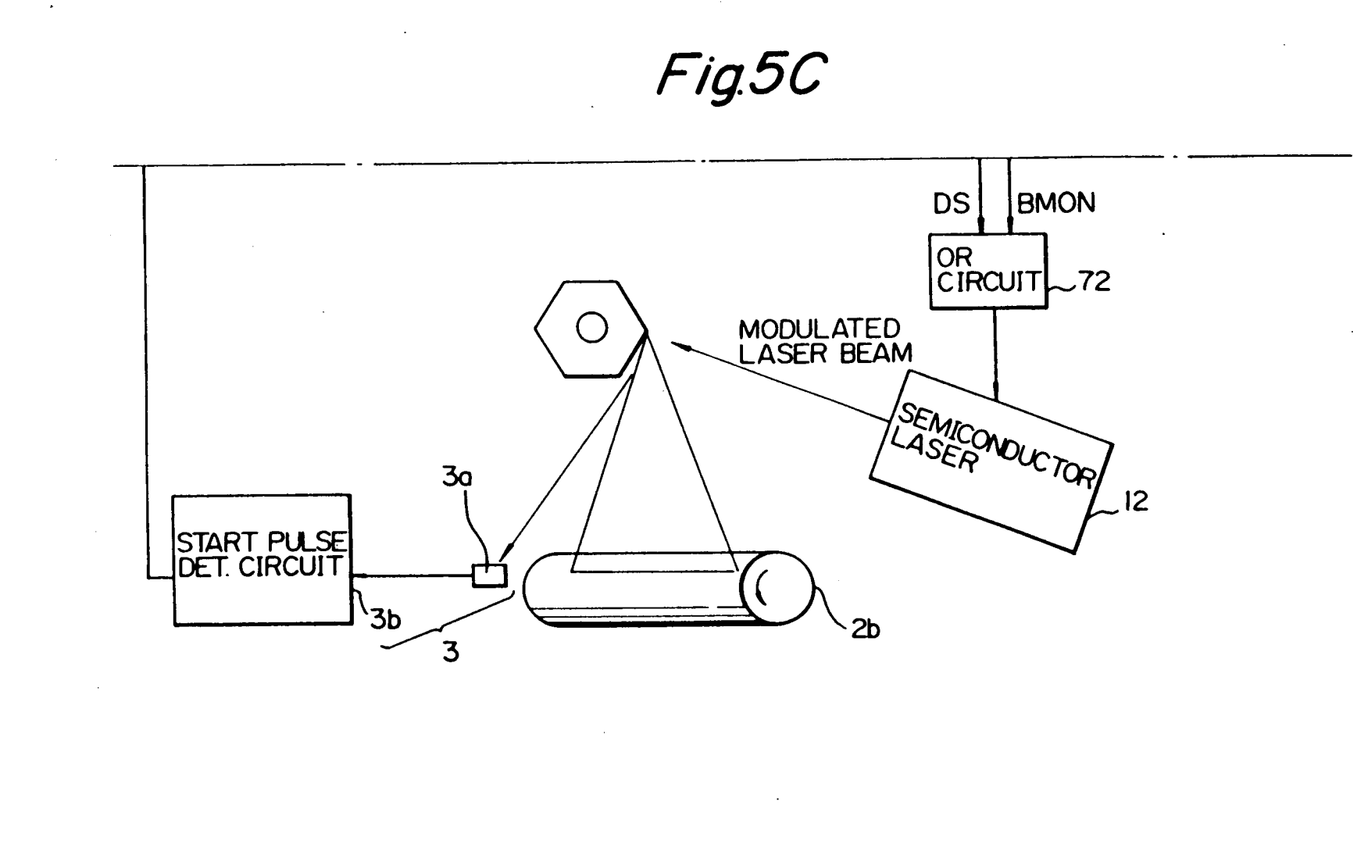

The composite of FIGS. 5A to 5C shows the construction of an other embodiment of the printing control system for the laser printer according to the present invention. In the drawing, the same portions as shown in FIGS. 1, 3A, 3B, and 3C are indicated with the same reference symbols.

Most of the printing control system for the laser printer in FIGS. 5A to 5C is the same as shown in FIGS. 3A to 3C. The only difference is the construction beam tube 10 and the AOM 11 are used as the laser beam source 1 but a directly operated semiconductor laser 12 such as a laser diode is used as the laser beam source 1 in FIGS. 5A to 5C. The operation of the system in FIGS. 5A to 5C is the same as the operation of the system in FIGS. 3A to 3C.

Although the present invention has been disclosed and described by way of one embodiment, it is apparent to those skilled in the art that other embodiments and modifications of the present invention are possible without departing from the spirit or essential features thereof.

For example, instead of the the rotary photosensitive drum 2b, a photosensitive film or other material can also be used.

I claim:

1. A printing control system for a laser printer having a laser beam source for emitting a modulated laser beam, a laser beam scanner, a printing data memory to modulate a laser beam, a readout circuit for reading out printing data from said printing data memory, a beam-on signal generating circuit for generating a beam-on signal to emit a start beam from said laser beam source, a start pulse generating circuit for generating a start pulse after the detection of said start beam, and a beam-on signal resetting circuit for resetting said beam-on signal after the detection of said start pulse, said system comprising:

an abnormal state detecting means for detecting an abnormal state by detecting an abnormal period of said start pulse;

a beam-on signal resetting means for forcibly resetting said beam-on signal when said abnormal state detecting means detects the abnormal state;

an inhibitting means for inhibitting a reading out operation of said readout circuit when said abnormal state detecting means detects the abnormal state;

an abnormal state counting means for counting the number of occurrences of said abnormal state; and a mechanism control means for interrupting a printing operation of the mechanism of said laser printer when the number of occurrences of said abnormal state counted by said abnormal state counting means exceeds a predetermined value.

2. A printing control system for a laser printer as set forth in claim 1, wherein:
   said laser beam source is comprised of a laser beam tube and an acoustic optical modulator.

3. A printing control system for a laser printer as set forth in claim 1, wherein:
   said laser beam source is comprised of a semiconductor laser.

* * * * *